United States Patent
Tsuchida et al.

(10) Patent No.: US 9,129,618 B1
(45) Date of Patent: Sep. 8, 2015

(54) HARD DISK DRIVE STEPPED LOAD BEAM

(71) Applicant: HGST Netherlands B.V., Amsterdam (NL)

(72) Inventors: Hiroyasu Tsuchida, Fujisawa (JP); Takuma Muraki, Yamato (JP); Yasuo Kojima, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/296,281

(22) Filed: Jun. 4, 2014

(51) Int. Cl.
*G11B 5/127* (2006.01)

(52) U.S. Cl.
CPC ..................... *G11B 5/127* (2013.01)

(58) Field of Classification Search
CPC ............... G11B 5/1278; G11B 2005/0024; G11B 5/3116; G11B 5/314; G11B 5/3146
USPC ............................. 360/245, 125.3
See application file for complete search history.

(56) References Cited

U.S. PATENT DOCUMENTS

| | | | |
|---|---|---|---|
| 5,796,553 A | 8/1998 | Tangren | |
| 5,870,252 A | 2/1999 | Hanrahan | |
| 6,995,953 B2 | 2/2006 | Mahoney et al. | |
| 7,068,470 B1 * | 6/2006 | Hadian et al. | 360/244.8 |
| 7,518,829 B1 | 4/2009 | Drape et al. | |
| 7,706,106 B1 * | 4/2010 | Mei et al. | 360/255 |
| 7,724,476 B1 * | 5/2010 | Bjorstrom et al. | 360/244.2 |
| 8,064,167 B2 * | 11/2011 | Fujimoto et al. | 360/245 |
| 8,254,063 B2 | 8/2012 | Zambri et al. | |
| 8,472,144 B2 * | 6/2013 | Fujimoto | 360/244.9 |
| 2008/0024927 A1 | 1/2008 | Hong et al. | |

OTHER PUBLICATIONS

Gih Keong Lau et al., Inline-actuated suspension for the fine head positioning of HDD, Journal of Micromechanics and Microengineering, Jun. 8, 2006, vol. 16 Issue 7,IOP Publishing.

* cited by examiner

*Primary Examiner* — Mark Blouin
(74) *Attorney, Agent, or Firm* — John D. Henkhaus (57) ABSTRACT

A stepped suspension load beam is described, such as for a hard disk drive, in which the main body is composed of a proximal portion that lies in a first plane, an intermediate portion between the proximal portion and a distal portion and that lies in a second plane that angles upward from the proximal portion, and a distal portion that lies in a third plane that angles back down from the intermediate portion, thereby forming a load beam stepped in the longitudinal direction. Further, the proximal portion may be formed to taper in at a first angle, the intermediate portion formed to taper in at a second angle that is less than the first angle, and the distal portion formed to taper in at a third angle greater than the first and second angles, thereby forming a load beam stepped in the transverse direction.

16 Claims, 7 Drawing Sheets

ON A SHAPED SHEET, FORMULATE A VIRTUAL FORMING LINE ALONG WHICH THE SHAPED SHEET IS FOLDABLE
602

PRESSING THE SHAPED SHEET ALONG THE FORMING LINE TO FORM A LOAD BEAM HAVING:
(A) A PROXIMAL PORTION AT A PROXIMAL END, A DISTAL PORTION AT A DISTAL END, AND AN INTERMEDIATE PORTION BETWEEN THE PROXIMAL PORTION AND THE DISTAL PORTION;
(B) THE PROXIMAL PORTION LYING IN A FIRST PLANE;
(C) THE INTERMEDIATE PORTION LYING IN A SECOND PLANE ANGLING UPWARD FROM THE FIRST PLANE;
(D) THE DISTAL PORTION LYING IN A THIRD PLANE ANGLING DOWNWARD FROM THE SECOND PLANE
(E) AN OUTER FLANGE OF THE PROXIMAL PORTION TAPERING IN, AT A FIRST TAPER ANGLE, TOWARD THE DISTAL END;
(F) AN OUTER FLANGE OF THE INTERMEDIATE PORTION TAPERING IN, AT A SECOND TAPER ANGLE, TOWARD THE DISTAL END;
(G) AN OUTER FLANGE OF THE DISTAL PORTION TAPERING IN, AT A THIRD TAPER ANGLE, TOWARD THE DISTAL END

FIG. 7

HARD DISK DRIVE STEPPED LOAD BEAM

FIELD OF EMBODIMENTS

Embodiments of the invention may relate generally to hard disk drives and more particularly to a stepped suspension load beam.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Figure 2:
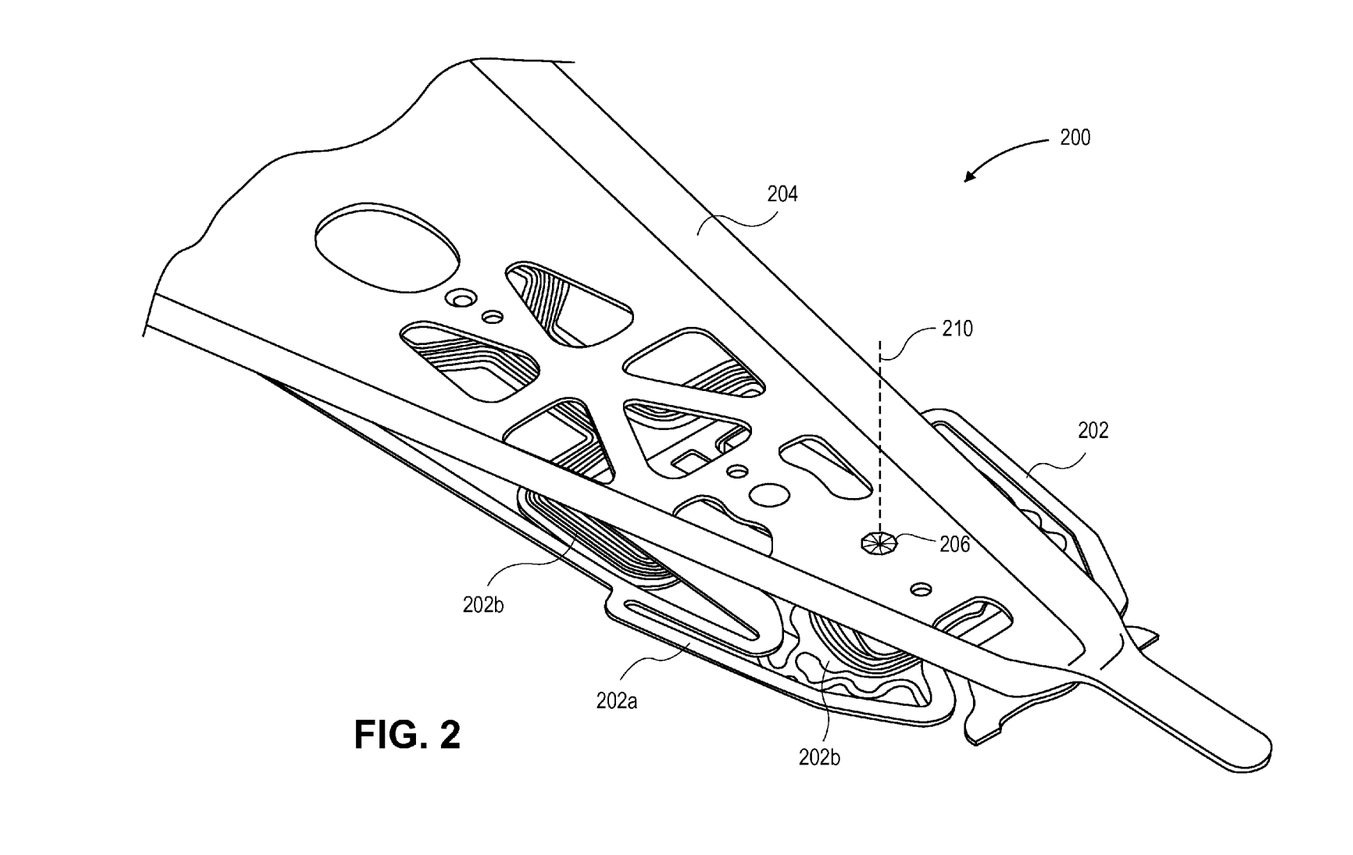
FIG. 2 is a perspective view illustrating a head gimbal assembly (HGA)

FIG. 2 is a perspective view illustrating a head gimbal assembly (HGA). An HGA may also be referred to as a flexure gimbal assembly. HGA 200 comprises a flexure 202 and a load beam 204 having a dimple 206. Based on the implementation, flexure 202 may comprise multiple assembled layers such as a stainless steel layer 202a, also referred to as a "spring layer" due to one of its functional characteristics, coupled with an insulating layer 202b. Flexure 202 may also, but need not, comprise a separate conductor layer. Flexure 202 is movably coupled to the load beam 204 via the gimbal 206 and has freedom of rotation about the dimple axis 210. Because a slider is coupled to a slider attachment platform of flexure 202, the slider likewise has freedom of rotation about dimple axis 210.

The HGA components, such as the flexure 202 and the load beam 204, interact with each other in an environment having very limited mechanical tolerances and clearances. Therefore, the static and dynamic characteristics of the HGA, such as the pitch static attitude (PSA) and the flying attitude (e.g., pitch and roll), respectively, may be mechanically limited because of the tight clearances. Furthermore, customers mandate meeting stringent performance requirements, including operational shock (or "op-shock") requirements, which generally relate to an HDD's operational resistance to or operational tolerance of a shock event. So once again the limited mechanical clearances associated with the HGA pose a challenge to meeting such requirements.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a stepped suspension load beam, as well as a hard disk drive comprising and a method of manufacturing such a load beam, where the load beam is stepped in the longitudinal direction and may be further stepped in the transverse direction.

According to an embodiment, the main body of the load beam is composed of a proximal portion that lies in a first plane, an intermediate portion between the proximal portion and a distal portion and that lies in a second plane that angles upward from the proximal portion, and a distal portion that lies in a third plane that angles back down from the intermediate portion, thereby forming a load beam stepped in the longitudinal direction. Such a load beam configuration provides for relative simplicity of manufacturing, whereby the planar portions of the load beam may be fabricated with a single pressing.

According to embodiments, the proximal portion tapers in at a first angle from the longitudinal direction, the intermediate portion tapers in at a second angle that is less than the first angle, and the distal portion tapers in but at a third angle greater than the first and second angles, thereby forming a load beam stepped in the transverse direction. Such a load beam configuration provides for relative simplicity of manufacturing, whereby the planar portions and outer edge flanges of each of the portions may be fabricated with a single pressing, or folding, that reduces high stress loading of the load beam during fabrication.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a stepped suspension load beam having a main body that is stepped in the longitudinal direction, and may be further stepped in the transverse direction, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Environment

Figure 1:
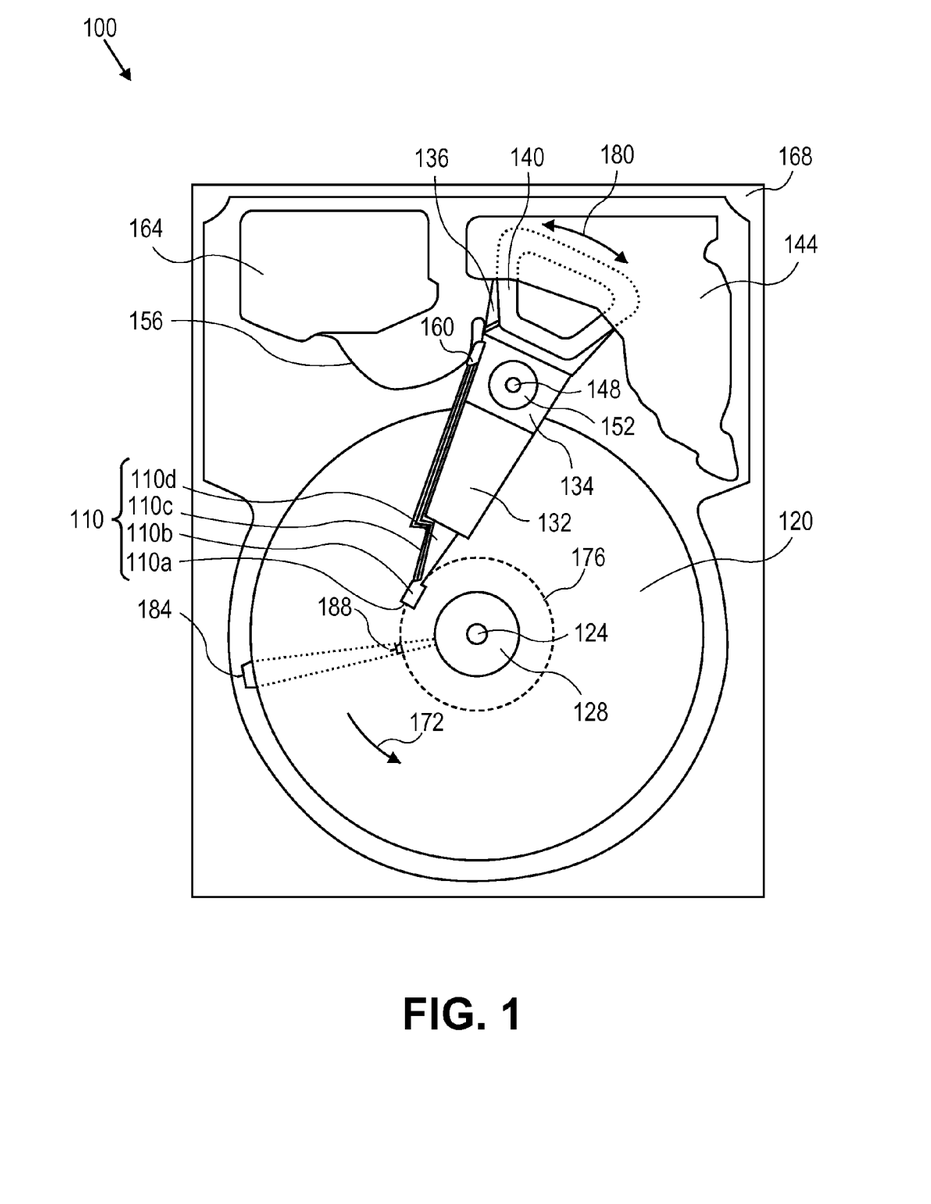
FIG. 1 is a plan view illustrating a hard disk drive, according to an embodiment of the invention.

Embodiments of the invention may be used in the context of a stepped load beam for a suspension assembly in a hard-disk drive (HDD) storage device. Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110, to access portions of the media 120, being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, and with reference to FIG. 2, the HGA 200 components such as the flexure 202 and the load beam 204 interact with each other in an environment having very limited mechanical tolerances and clearances. Therefore, the static and dynamic characteristics of the HGA may be mechanically limited because of the tight clearances. For example, due to the limited mechanical clearance between suspension components, the flexure 202 and load beam 204 may make undesirable contact while the slider is flying during operation or in response to an op-shock event, and the like. That is, as the slider gimbals about the gimbal 206 in response to, e.g., disk micro-contours or an op-shock event, the flexure 202 to which the slider is fairly rigidly affixed may also gimbal about the gimbal 206 and in doing so the flexure 202 might make contact with the load beam 204 at a location proximal (toward the actuator arm) to the gimbal 206. Such contact would affect the slider flying stability, may cause undesirable disk-slider contact (a "crash"), and the like. For another example, the slider's static attitude may also be constrained due to the limited clearances within the HGA.

Based at least on the foregoing, creating some additional clearance within the HGA, particularly between the flexure and the load beam, is desirable.

A Stepped Suspension Load Beam

Figure 3:
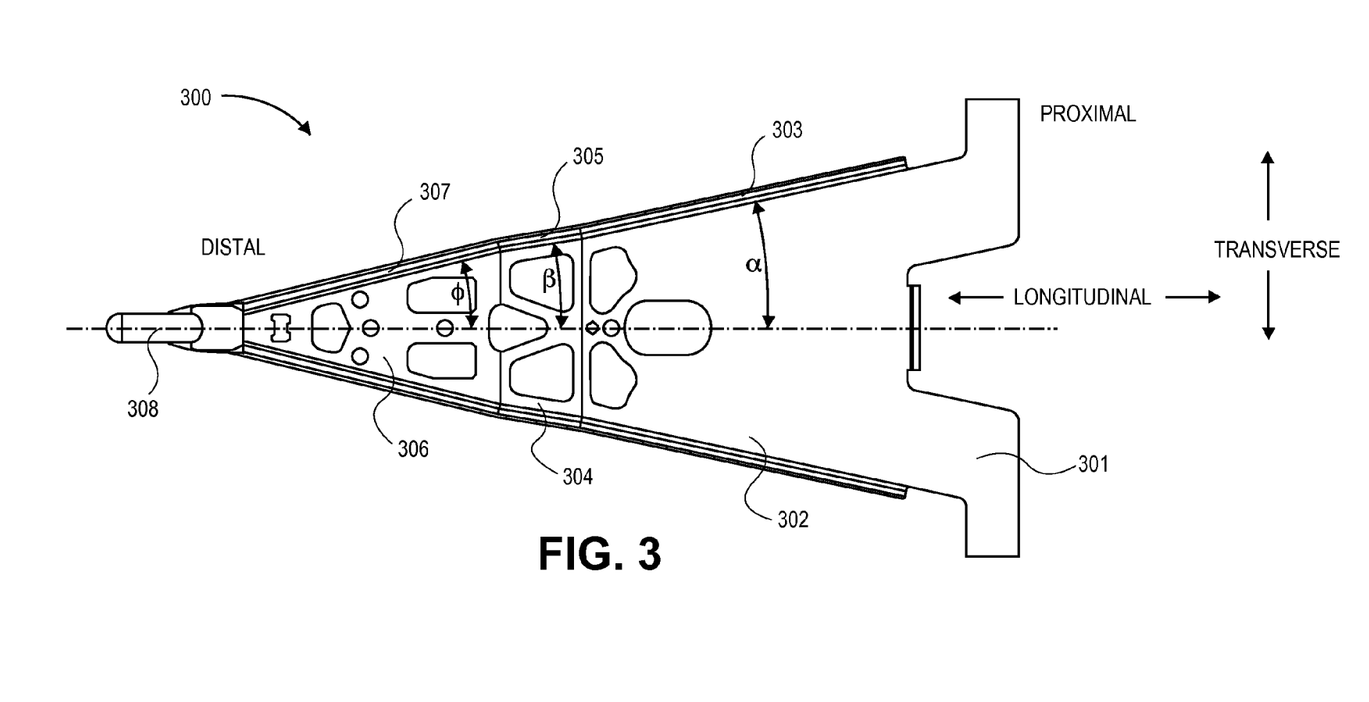
FIG. 3 is a plan view illustrating a stepped load beam, according to an embodiment of the invention.

FIG. 3 is a plan view illustrating a stepped load beam, according to an embodiment of the invention. Load beam 300 comprises a main body 301 which has a proximal end and a distal end along the longitudinal direction, as depicted in FIG. 3. According to an embodiment utilizing load/unload mechanics, load beam 300 further comprises a lift tab 308 extending from distal end of the main body 301, for use in moving (i.e., also referred to as loading/unloading) the head slider (see, e.g., slider 110b and head 110a of FIG. 1) from over the disk onto a ramp and from the ramp to over the disk.

According to an embodiment, the main body 301 comprises (a) a proximal portion 302 at the proximal end, lying in a first plane; (b) a distal portion 306 at the distal end, lying in a third plane; and (c) an intermediate portion 304 between the proximal portion 302 and the distal portion 306, lying in a second plane that angles upward from the first plane of proximal end 302. According to an embodiment, the third plane of the distal portion 306 angles downward from the second plane of the intermediate portion 304. Thus, load beam 300 is stepped in the longitudinal direction. According to an embodiment, the proximal portion 302, the intermediate portion 304 and the distal portion 306 together constitute an integral load beam component, e.g., fabricated together from a single base sheet of material such as aluminum or steel, or the like.

Figure 4A:
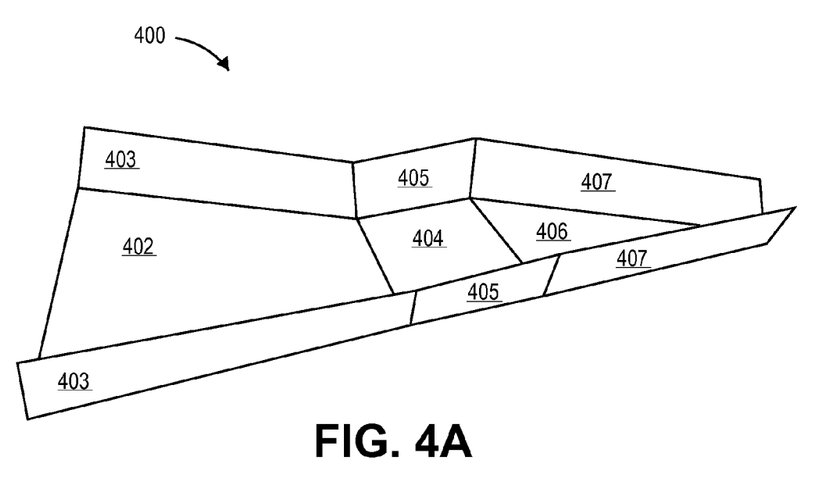
FIG. 4A is a perspective view illustrating a simplified model of a stepped load beam, according to an embodiment of the invention.

FIG. 4A is a perspective view illustrating a simplified model of a stepped load beam, according to an embodiment of the invention. FIG. 4A depicts a stepped load beam 400, in a simplified model form of stepped load beam 300 (FIG. 3). For example, the model stepped load beam 400 may be formed with a paper sheet using Origami folding techniques. As described in reference to the stepped load beam 300 of FIG. 3, similarly, the model stepped load beam 400 comprises a proximal portion 402 lying in a first plane, an intermediate portion 404 lying in a second plane angling upward from the first plane, and a distal portion 406 lying in a third plane angling downward from the second plane. Again referring to Origami techniques, such a fold is referred to as a valley fold and/or a mountain fold, where the interface fold of proximal portion 402 and intermediate portion 404 is likened to a "valley" and the interface fold of intermediate portion 404 and distal portion 406 is likened to a "mountain".

With further reference to FIG. 3, the main body 301 comprises (a) an outer edge 303 of the proximal portion 302, which tapers in at a first angle α from the longitudinal direction line toward the distal end; (b) an outer edge 305 of the intermediate portion 304, which tapers in at a second angle β from the longitudinal direction line toward the distal end, where β is less than α; and (c) an outer edge 307 of the distal portion 306, which tapers in at a third angle φ from the longitudinal direction line toward the distal end. According to an embodiment, φ is greater than α. The value for each of the angles α, β and φ may vary from implementation to implementation. For a non-limiting example, α may be around 12 degrees, β around 9 degrees, and φ around 14 degrees. Thus, according to an embodiment, load beam 300 is further stepped in the transverse direction.

Figure 4B:
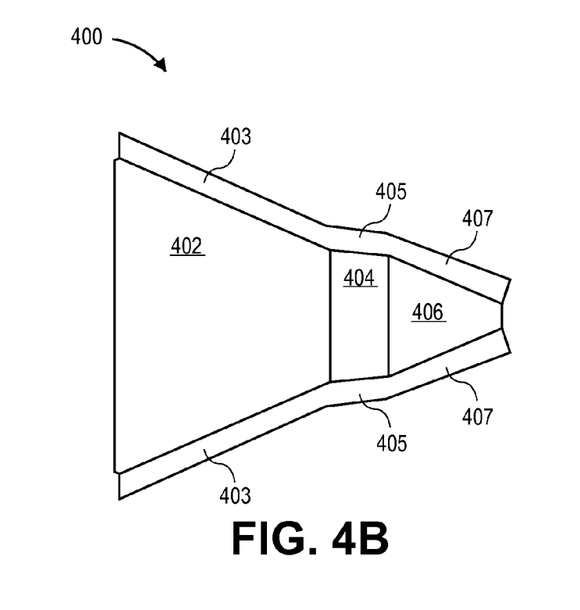
FIG. 4B is a plan view illustrating a simplified model of the stepped load beam of FIG. 4A, according to an embodiment of the invention.

FIG. 4B is a plan view illustrating a simplified model of the stepped load beam of FIG. 4A, according to an embodiment of the invention. FIG. 4B depicts the stepped load beam 400, in a simplified model form of stepped load beam 300 (FIG. 3). Once again, the model stepped load beam 400 may be formed with a paper sheet using Origami folding techniques. As described in reference to the stepped load beam 300 of FIG. 3, similarly, the model stepped load beam 400 comprises an outer edge 403 of the proximal portion 402, which tapers in at a first angle from the longitudinal direction line toward the distal end; an outer edge 405 of the intermediate portion 404, which tapers in at a second angle from the longitudinal direction line toward the distal end; and an outer edge 407 of the distal portion 406, which tapers in at a third angle from the longitudinal direction line toward the distal end, where the second angle is less than first angle which is less than the third angle. Again referring to Origami techniques, such a fold is referred to as a valley fold and/or a mountain fold, where the interface edge fold of the outer edge 403 of proximal portion 402 and the outer edge 405 of the intermediate portion 404 is likened to a "valley", and the interface edge fold of outer portion 405 of the intermediate portion 404 and the outer edge 407 of the distal portion 406 is likened to a "mountain".

Figure 5:
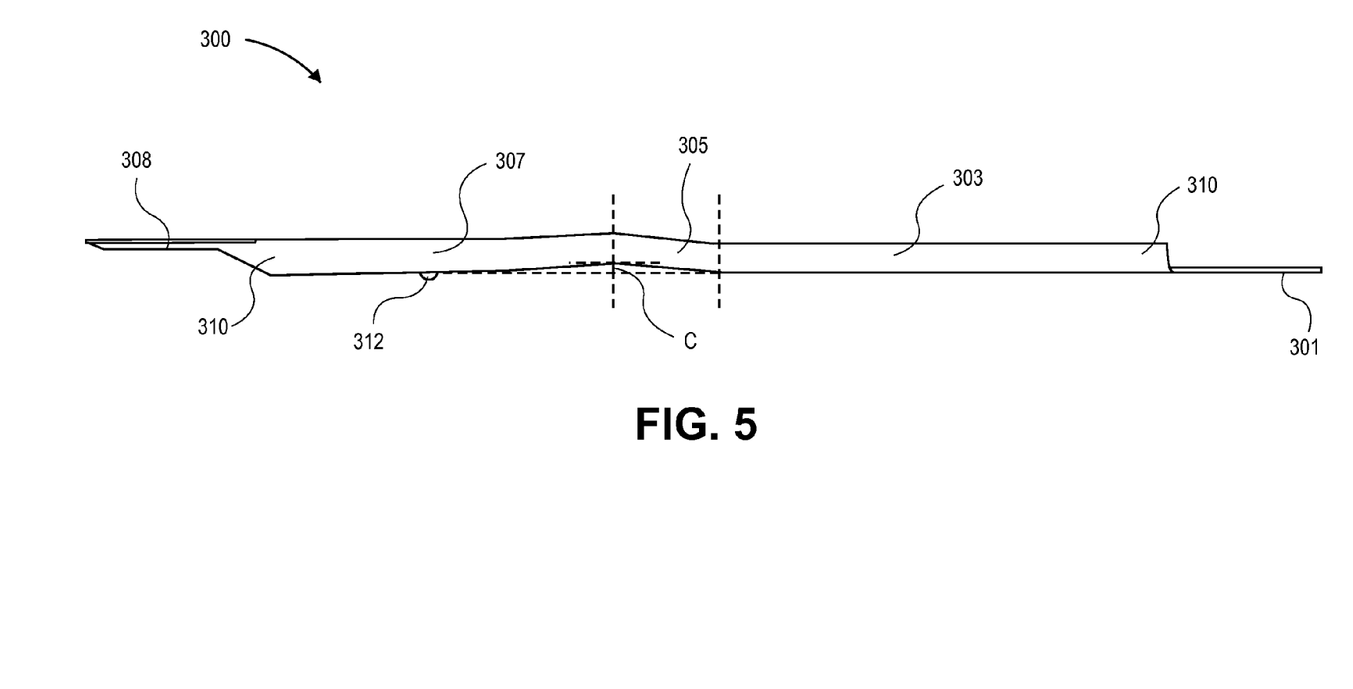
FIG. 5 is side view illustrating a stepped load beam, according to an embodiment of the invention.

FIG. 5 is side view illustrating a stepped load beam, according to an embodiment of the invention. As described in reference to the stepped load beam 300 of FIG. 3, load beam 300 comprises a main body 301 and, according to an embodiment utilizing load/unload mechanics, a lift tab 308 extending from the distal end of the main body 301.

The main body 301 comprises the proximal portion 302 (FIG. 3) at the proximal end, the distal portion 306 (FIG. 3) at the distal end, and the intermediate portion 304 (FIG. 3) between the proximal portion 302 and the distal portion 306. According to an embodiment, the main body 301 further comprises a flange 310, comprising the outer edge 303 of the proximal portion 302, the outer edge 305 of the intermediate portion 304, and the outer edge 307 of the distal portion 306. Also shown is a dimple 312, the operation of which is described in reference to dimple 206 and dimple axis 210 of FIG. 2.

With reference to FIG. 5, the vertical dashed lines approximate the transitions between the proximal and intermediate portions, and the intermediate and distal portions, respectively. As shown, the intermediate portion and corresponding outer edge 305 angles upward from the proximal portion and corresponding outer edge 303, and the distal portion and corresponding outer edge 307 angles back downward from the intermediate portion and corresponding outer edge 305. Stated otherwise, load beam 300 is stepped in the longitudinal direction. Consequently, a mechanical clearance C is provided. Likewise, clearance C is provided between the flexure 202 (FIG. 2) and the load beam 300 in an HGA assembly, thereby inhibiting undesirable contact while the slider is flying during operation or in response to an op-shock event, and the like. Note that the clearance C depicted in FIG. 5 is not necessarily drawn to scale and that clearance C may be depicted in exaggerated form for purposes of description and visual clarity. Furthermore, the amount of clearance C may vary from implementation to implementation based, for example, on the corresponding HGA configuration, design goals, and the like. However, for purposes of a non-limiting example, achieving a clearance C of 0.25 µm (micrometers, or microns) is believed to be within the range of achievable clearances.

Manufacturing a Stepped Load Beam

Figure 6:
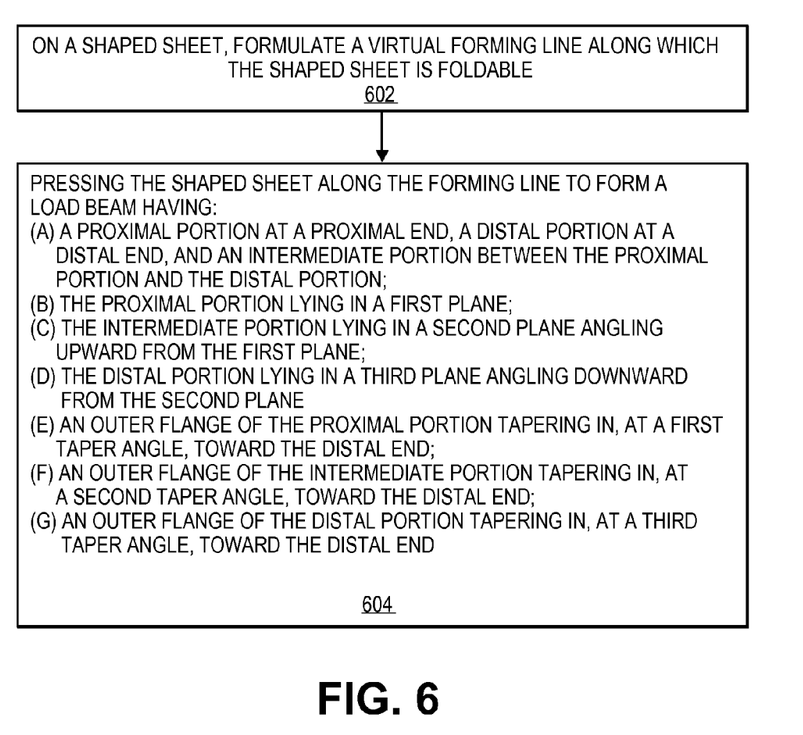
FIG. 6 is a flow diagram illustrating a method for manufacturing a stepped load beam, according to an embodiment of the invention.

FIG. 6 is a flow diagram illustrating a method for manufacturing a stepped load beam, according to an embodiment of the invention. At block 602, on a shaped sheet, a virtual forming line along which the shaped sheet is foldable is formulated. That is, once a load beam design is generated, a forming line is determined based on the design goals, where a sheet of metal that is shaped according to the design goals, when folded along the determined forming line, produces the designed load beam product. For example, a stepped load beam according to the embodiments herein may be formed using Origami folding techniques as previously described.

At block 604, the shaped sheet is pressed, or folded, along the forming line to form a load beam. According to an embodiment, the shaped sheet is pressed along a forming line to form a load beam having a proximal portion at a proximal end, a distal portion at a distal end, and an intermediate portion between the proximal and distal portions, where the proximal portion lies in a first plane, the intermediate portion lies in a second plane angling upward from the first plane, and the distal portion lies in a third plane angling downward from the second plane, for example, as described in reference to load beam 300 (FIG. 3), model stepped load beam 400 (FIGS. 4A, 4B), and load beam 500 (FIG. 5). According to an embodiment, the pressing of block 604 consists of only a single pressing to form the described shape of a longitudinally stepped load beam.

For example, a virtual forming line can be formulated for fabricating a stepped load beam such as the model stepped load beam 400 (FIGS. 4A, 4B) such that a proximal portion 402 (FIGS. 4A, 4B) lies in a first plane, an intermediate portion 404 (FIGS. 4A, 4B) lies in a second plane angling upward from the first plane, and a distal portion 406 (FIGS. 4A, 4B) lies in a third plane angling downward from the second plane. Again referring to Origami techniques, such a fold is referred to as a valley fold and/or a mountain fold, where the interface fold of proximal portion 402 and intermediate portion 404 is likened to a "valley" and the interface fold of intermediate portion 404 and distal portion 406 is likened to a "mountain".

Returning to FIG. 6, according to an embodiment the pressing of the shaped sheet at block 604 forms a load beam further comprising an outer edge flange of the proximal portion that tapers in toward the distal end at a first taper angle, an outer edge flange of the intermediate portion that tapers in toward the distal end at a second taper angle, and an outer flange of the distal portion that tapers in toward the distal end at a third angle, for example, as described in reference to load beam 300 (FIG. 3), model stepped load beam 400 (FIGS. 4A, 4B), and load beam 500 (FIG. 5). According to an embodiment, the pressing of block 604 consists of only a single pressing to form the described shape of a longitudinally and transversely stepped load beam.

Using a conventional load beam formation method, it would be a significant challenge to fabricate the desired stepped load beam in the longitudinal direction, requiring the addition of one or more physical steps to portions of the "box" shape (i.e., a flanged sheet). For fabricating such a form using conventional load beam formation techniques, two or more presses and control would be needed. However, the Origami-type fabrication technology described herein presses the shape such that the material can be folded, or bent, without cutting (i.e., like with Origami). Further, very minimal stress is applied to the material during fabrication, thereby avoiding damage to the material such as through buckling.

Figure 7:
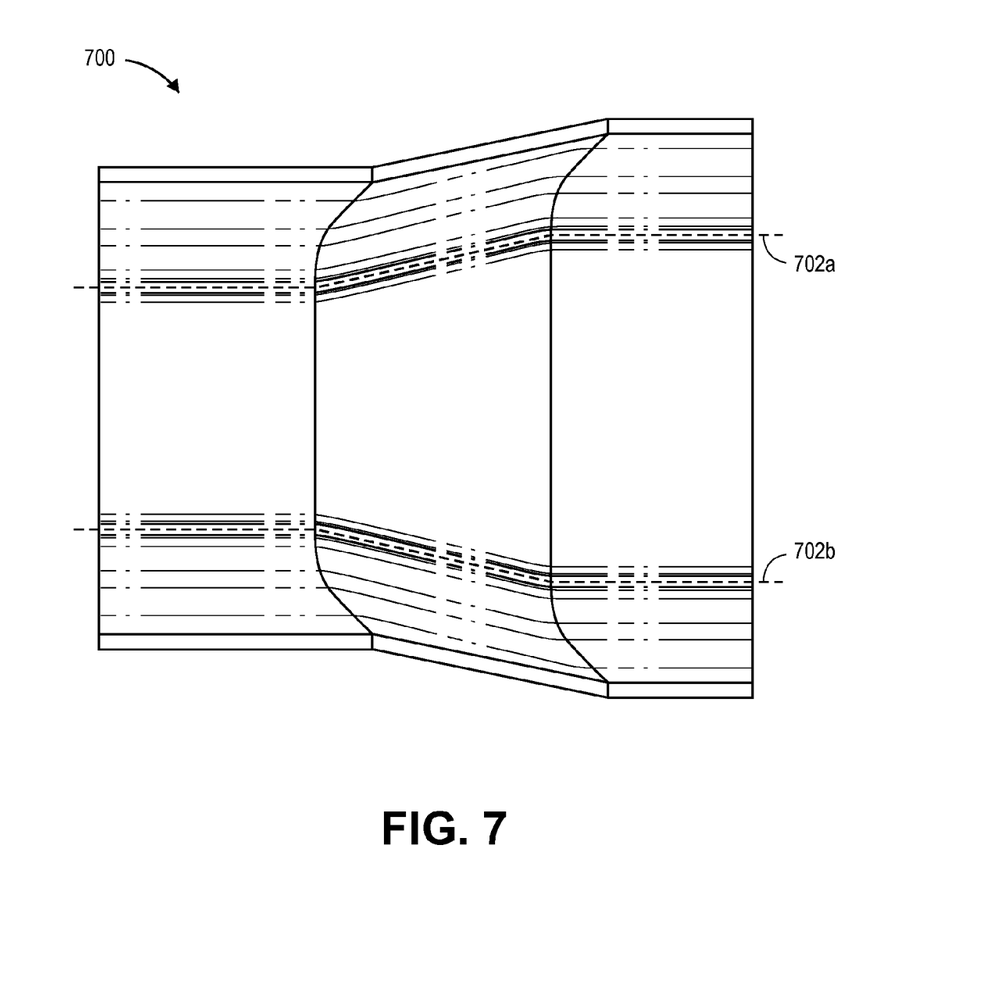
FIG. 7 is a plan view illustrating a virtual forming line associated with a shaped sheet, according to an embodiment of the invention.

Still further, the load beam is freely bendable with minimal stress at arbitrary design angles in the up-and-down direction (e.g., into the page with reference to FIG. 3, or in the clearance C direction with reference to FIG. 5) by two or more angle changes to the forming lines (e.g., forming lines 702a, 702b of FIG. 7).

For example, a virtual forming line can be formulated for fabricating a stepped load beam such as the model stepped load beam 400 (FIGS. 4A, 4B) such that an outer edge 403 (FIGS. 4A, 4B) of the proximal portion 402 (FIGS. 4A, 4B) tapers in at a first angle from the longitudinal direction line toward the distal end, an outer edge 405 (FIGS. 4A, 4B) of the intermediate portion 404 (FIGS. 4A, 4B) tapers in at a second angle from the longitudinal direction line toward the distal end, and an outer edge 407 (FIGS. 4A, 4B) of the distal portion 406 (FIGS. 4A, 4B) tapers in at a third angle from the longitudinal direction line toward the distal end. Again referring to Origami techniques, such a fold is referred to as a valley fold and/or a mountain fold, where the interface edge fold of the outer edge 403 of proximal portion 402 and the outer edge 405 of the intermediate portion 404 is likened to a "valley", and the interface edge fold of outer portion 405 of the intermediate portion 404 and the outer edge 407 of the distal portion 406 is likened to a "mountain".

FIG. 7 is a plan view illustrating a virtual forming line associated with a shaped sheet, according to an embodiment of the invention. Shaped sheet 700 represents a fabricated form according to the method illustrated in FIG. 6, with forming line 702a (dashed) and forming line 702b (dashed) being forming lines at which a base sheet is folded to produce a three-dimensional formed shape similar to a portion of load beam 300 (FIG. 3), model stepped load beam 400 (FIGS. 4A, 4B), and load beam 500 (FIG. 5).

As mentioned and according to an embodiment, the stepped load beam 300 (FIG. 3) may be fabricated from a single base sheet of material, using the techniques described in reference to FIG. 6, where the proximal portion 302, the intermediate portion 304 and the distal portion 306 together constitute an integral load beam component formed together as a unit.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A suspension load beam, comprising:
 a main body having a proximal end and a distal end along a longitudinal direction, said main body comprising:
  a proximal portion at said proximal end and lying in a first plane,
  a distal portion at said distal end and lying in a third plane, said distal portion comprising a dimple,
  an intermediate portion between said proximal portion and said distal portion and lying in a second plane angling upward from said first plane, and
 a lift tab extending in said longitudinal direction from said distal portion of said main body.

2. The suspension load beam of claim 1, comprising:
 said distal portion lying in said third plane angling downward from said second plane.

3. The suspension load beam of claim 1, comprising:
 an outer edge of said proximal portion tapering in, at a first taper angle from said longitudinal direction, toward the distal end;
 an outer edge of said intermediate portion tapering in, at a second taper angle from said longitudinal direction that is less than said first taper angle, toward the distal end; and
 an outer edge of said distal portion tapering in, at a third taper angle from said longitudinal direction, toward the distal end.

4. The suspension load beam of claim 3, wherein said third taper angle is greater than said first taper angle.

5. The suspension load beam of claim 3, wherein said outer edge of said proximal portion, said outer edge of said distal portion, and said outer edge of said intermediate portion comprise a flange portion of said main body.

6. The suspension load beam of claim 1, wherein said proximal portion, said distal portion, and said intermediate portion form an integral load beam component.

7. A hard disk drive comprising:
 a disk media rotatably mounted on a spindle;
 a suspension coupled to an actuator arm, said suspension comprising a load beam comprising:
  a main body having a proximal end and a distal end along a longitudinal direction, said main body comprising:
   a proximal portion at said proximal end and lying in a first plane,
   a distal portion at said distal end and lying in a third plane, said distal portion comprising a dimple,
   an intermediate portion between said proximal portion and said distal portion and lying in a second plane angling upward from said first plane, and
  a lift tab extending in said longitudinal direction from said distal portion of said main body.

8. The hard disk drive of claim 7, comprising:
 said distal portion lying in said third plane angling downward from said second plane.

9. The hard disk drive of claim 7, comprising:
 an outer edge of said proximal portion tapering in, at a first taper angle from said longitudinal direction, toward the distal end;
 an outer edge of said intermediate portion tapering in, at a second taper angle from said longitudinal direction that is less than said first taper angle, toward the distal end; and
 an outer edge of said distal portion tapering in, at a third taper angle from said longitudinal direction, toward the distal end.

10. The hard disk drive of claim 9, wherein said third taper angle is greater than said first taper angle.

11. The hard disk drive of claim 9, wherein said outer edge of said proximal portion, said outer edge of said distal portion, and said outer edge of said intermediate portion comprise a flange portion of said main body.

12. The hard disk drive of claim 7, wherein said proximal portion, said distal portion, and said intermediate portion of said main body of said load beam form an integral load beam component.

13. A method for manufacturing a stepped load beam, the method comprising:
 on a shaped sheet, formulating a virtual forming line along which said shaped sheet is foldable;
 pressing said shaped sheet along said forming line to form a stepped load beam having:
  a proximal portion at a proximal end and lying in a first plane,
  a distal portion at a distal end and lying in a third plane, and
  an intermediate portion between said proximal portion and said distal portion and lying in a second plane angling upward from said first plane.

14. The method of claim 13, wherein said pressing consists of a single pressing.

15. The method of claim 13, wherein said pressing consists of a single pressing of said shaped sheet along said forming line, said stepped load beam having:
 an outer flange of said proximal portion tapering in, at a first taper angle, toward the distal end,
 an outer flange of said intermediate portion tapering in, at a second taper angle that is less than said first taper angle, toward the distal end, and
 an outer flange of said distal portion tapering in, at a third taper angle, toward the distal end.

16. The method of claim 15, wherein said third taper angle is greater than said first taper angle.

* * * * *